United States Patent
Van Velzen et al.

(10) Patent No.: US 9,857,840 B2
(45) Date of Patent: Jan. 2, 2018

(54) VEHICLE MULTIMEDIA SYSTEM AND VEHICLE

(71) Applicant: Harman Becker Automotive Systems GmbH, Karlsbad (DE)

(72) Inventors: Edgar Van Velzen, Karlsruhe (DE); Markus Heisinger, Pfinztal (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 220 days.

(21) Appl. No.: 14/097,839

(22) Filed: Dec. 5, 2013

(65) Prior Publication Data

US 2014/0160667 A1 Jun. 12, 2014

(30) Foreign Application Priority Data

Dec. 6, 2012 (EP) .................................... 12195845

(51) Int. Cl.
- *G06F 1/16* (2006.01)
- *B60R 11/02* (2006.01)
- *G11B 19/02* (2006.01)
- *H04N 21/414* (2011.01)

(52) U.S. Cl.
CPC ........ *G06F 1/1632* (2013.01); *B60R 11/0241* (2013.01); *B60R 11/0252* (2013.01); *G11B 19/02* (2013.01); *H04N 21/41422* (2013.01)

(58) Field of Classification Search
CPC ............. B60R 11/0235; B60R 11/0241; B60R 11/0252; H04N 21/41422
USPC ....................... 710/303; 348/837; 361/679.41
See application file for complete search history.

(56) References Cited

U.S. PATENT DOCUMENTS

| | | | |
|---|---|---|---|
| 6,539,358 B1 * | 3/2003 | Coon .................. | B60R 11/0241 704/251 |
| 6,788,528 B2 * | 9/2004 | Enners .................... | B60R 11/02 248/918 |
| 7,286,857 B1 * | 10/2007 | Walker ................ | H04M 1/6075 455/420 |
| 7,900,988 B2 * | 3/2011 | Ryu .................... | B60R 11/0235 224/483 |

(Continued)

FOREIGN PATENT DOCUMENTS

| | | |
|---|---|---|
| CN | 1866386 A | 11/2006 |
| CN | 101910999 A | 12/2010 |

(Continued)

OTHER PUBLICATIONS

Skoda Auto, "Radio Bolero Operating Instructions", 2012, 20 pages.

(Continued)

*Primary Examiner* — Adrian S Wilson
(74) *Attorney, Agent, or Firm* — Brooks Kushman P.C.

(57) ABSTRACT

Various embodiments relate to a vehicle multimedia system comprising a portable device and a docking station. The portable device is configured for being releasably mounted in the docking station and comprises data storage for storing multimedia data. A first interface of the portable device and a third interface of the docking station are configured for establishing data connection between the docking station and the portable device. The docking station further comprises a second interface configured for establishing data connection with a vehicle head unit.

17 Claims, 3 Drawing Sheets

(56) References Cited

U.S. PATENT DOCUMENTS

| | | | | |
|---|---|---|---|---|
| 7,909,397 | B2* | 3/2011 | Shalam | B60R 11/0235 297/217.1 |
| 8,090,030 | B2* | 1/2012 | Kim | G06F 3/14 375/240.28 |
| 8,554,191 | B2* | 10/2013 | White | G06Q 30/0267 455/3.06 |
| 8,634,033 | B2* | 1/2014 | Vanderwall | G01C 11/02 348/836 |
| 8,818,725 | B2* | 8/2014 | Ricci | G06F 9/54 340/539.13 |
| 2001/0001319 | A1* | 5/2001 | Beckert | B60R 11/02 701/36 |
| 2001/0035683 | A1* | 11/2001 | Yearwood | B60R 11/02 307/10.1 |
| 2004/0237111 | A1* | 11/2004 | Iraclianos | B60K 35/00 725/75 |
| 2006/0052097 | A1* | 3/2006 | Struthers | H04H 20/63 455/422.1 |
| 2006/0282861 | A1* | 12/2006 | Chen | G11B 27/105 725/75 |
| 2007/0101039 | A1* | 5/2007 | Rutledge | G06F 1/1632 710/303 |
| 2007/0271583 | A1* | 11/2007 | Chen | H04N 7/183 725/75 |
| 2008/0027572 | A1* | 1/2008 | Romoser | B60R 11/02 700/94 |
| 2008/0084834 | A1* | 4/2008 | Stanek | G06F 13/385 370/284 |
| 2008/0244050 | A1* | 10/2008 | Wong | H04L 41/12 709/223 |
| 2009/0096576 | A1* | 4/2009 | Oman | G07C 5/008 340/5.62 |
| 2009/0175458 | A1 | 7/2009 | Smith | |
| 2009/0178097 | A1* | 7/2009 | Kim | G06F 3/14 725/114 |
| 2009/0222862 | A1* | 9/2009 | Dayan | G11B 31/00 725/75 |
| 2009/0292851 | A1* | 11/2009 | Mead | G06F 1/1632 710/303 |
| 2010/0067197 | A1* | 3/2010 | Guccione | G06F 1/26 361/728 |
| 2010/0149748 | A1* | 6/2010 | Lam | G06F 1/1632 361/679.41 |
| 2010/0188808 | A1* | 7/2010 | Howarth | G06F 1/1632 361/679.41 |
| 2010/0195279 | A1* | 8/2010 | Michael | G06F 1/1632 361/679.41 |
| 2010/0220250 | A1* | 9/2010 | Vanderwall | G01C 11/02 348/837 |
| 2011/0188197 | A1* | 8/2011 | Jackson | H05K 5/00 361/679.41 |
| 2012/0214323 | A1* | 8/2012 | Gore | H04N 9/3173 439/212 |
| 2013/0309901 | A1* | 11/2013 | Hilbourne | H01R 13/516 439/502 |
| 2014/0106783 | A1* | 4/2014 | Kelly | H04L 67/12 455/456.3 |

FOREIGN PATENT DOCUMENTS

| | | |
|---|---|---|
| EP | 1698518 A2 | 9/2006 |
| EP | 1985500 A1 | 10/2008 |
| WO | 2007064536 A1 | 6/2007 |

OTHER PUBLICATIONS

Extended European Search Report for corresponding European Application No. 12195845.8, May 10, 2013, 6 pages.

European Office Action for corresponding Application No. 12 195 845.8-1803, dated Sep. 15, 2016, 7 pages.

Chinese Office Action and English translation for Application No. 201310656734.0, dated Mar. 1, 2016, 16 pages.

* cited by examiner

VEHICLE MULTIMEDIA SYSTEM AND VEHICLE

CROSS-REFERENCE TO RELATED APPLICATIONS

This application claims priority to EP Application No. 12 195 845.8, filed Dec. 6, 2012, the disclosure of which is incorporated in its entirety by reference herein.

TECHNICAL FIELD

Various embodiments relate to a vehicle multimedia system and a vehicle. In particular, various embodiments relate to the vehicle multimedia system comprising a docking station configured for releasably mounting a portable device of the vehicle multimedia system and comprising a second interface and a third interface configured for establishing data connection with a vehicle head unit and the portable device, respectively.

BACKGROUND

Vehicle multimedia interfaces are known which allow connecting a third-party portable device to a vehicle head unit for multimedia playback. For example, such vehicle multimedia interfaces can be configured to receive analogue audio data or to operate according to the Universal Serial Bus (USB) standard and establish data connection to and from the vehicle head unit and the third-party portable device. A user can select multimedia tracks stored on the portable device for playback in the vehicle. Then, the portable device provides the multimedia data to the vehicle head unit. For example, a user interface of a vehicle of the vehicle multimedia interface may be configured to allow said selecting. For example, the user interface may be a display, buttons, a touch panel, etc. For example, the third-party portable device may be a cellular phone, a laptop, a touch pad, etc.

Yet, such vehicle multimedia interfaces face certain restrictions and drawbacks. For example, the data connection established by the vehicle multimedia interface may only offer limited access to the third-party portable device; in other words, the third-party portable device may not be fully integrated into the vehicle electronics. This may have the effect that control of the third-party portable device via the user interface may be difficult to implement and/or only offer restricted choices to a user; for example, not all functionality of the portable device may be accessible by the user via the user interface.

Therefore, a need exists to provide an improved vehicle multimedia system. In particular, a need exists to provide a vehicle multimedia system which allows for a high degree of integration of a portable device.

SUMMARY

This need is met by the features of the independent claims. The dependent claims define embodiments.

According to an aspect, a vehicle multimedia system is provided. The vehicle multimedia system includes a portable device and a docking station. The portable device is configured for being releasably mounted in the docking station and includes a data storage for storing multimedia data and a first interface configured for establishing data connection with the docking station. The docking station is configured for said releasably mounting of the portable device and includes a second interface configured for establishing data connection with a vehicle head unit. The docking station further includes a third interface configured for establishing data connection with the portable device.

Therefore, the docking station may serve a data gateway between the vehicle head unit and the portable device. In particular, the docking station may include active electronic units such as a processor, working memory, etc. The docking station may further function as a mounting bay or cradle for the portable device.

For example, the established data connection may allow for transmission of the stored multimedia data and/or control data. The control data may enable control and operation of multimedia playback of the multimedia data, energy management of the portable device (hibernating mode, stand-by mode, power-on/off, etc.), data management of the data storage (deleting files, adding files, etc.), etc.

The vehicle multimedia system and the vehicle head unit may be located in a vehicle. For example, the vehicle head unit may be configured to playback (i.e., output via loudspeakers and/or a display of the device, multimedia data stored on the data storage of the portable device). The multimedia data may relate to: audio data, video data, and/or image data, etc. The vehicle head unit may be configured to playback the multimedia data in response to a user command received via a user interface (e.g., a touch panel, buttons, voice or gesture recognition, etc.).

The data storage of the portable device may comprise storage means selected from the group consisting of: BluRay Disc, Compact Disc, Hard Disc Drive, Flash Memory.

By such techniques as outlined above, it may be possible to fully integrate portable device into the vehicle multimedia system. For example, when the portable device is mounted to the docking station, the data connection may allow access to the data storage by the vehicle head unit as if the data storage of the portable device was an internal memory of the vehicle head unit (e.g., directly attached to a processor of the vehicle head unit via a respective data communication standard such as Serial Advanced Technology Attachment (SATA)). For example, for this purpose the data connection between the vehicle head unit and the second interface of the docking station may operate according to specific data connection standards, such as the Media Orientated System Transport (MOST) bus system or the Controller Area Network (CAN) bus system. Such a scenario may be in contrast to a multimedia data connection only, where only restricted access to the multimedia data is granted.

The portable device may further comprise a fourth interface being configured for establishing a data connection with a home entertainment system.

For example, the home entertainment system may be selected from the group consisting of: hifi-system, multimedia receiver, TV, computer, laptop.

For example, the first interface of the portable device and the fourth interface of the portable device may be arranged in separate positions on the outer surface of the portable device and therefore may be separate entities. However, it is also possible that the first interface of the portable device and the fourth interface of the portable device share some elements (e.g., electrical pins, etc.).

Besides this possibility of providing joint technical features, it is also possible to establish data connection between the first and fourth interfaces of the portable device to some larger or smaller degree according to the same data connection standards. However, in general, it should be understood that it is possible to operate the first and fourth interfaces of the portable device according to different data connection standards.

By providing the first and fourth interfaces of the portable device it may be possible to flexibly establish data connections (e.g., depending on a mode of operation which corresponds to the portable device being connected either to the docking station or the home entertainment system). For example, when the portable device is mounted to and connected with the docking station, the data connection established via the first interface of the portable device and the third interface of the docking station may be specific for the in-vehicle use of the portable device. In particular, the data connection may be suited to allow full electronic integration of the portable device with the vehicle head unit. In other words, it may be possible to enable the vehicle head unit to fully access and control the stored multimedia data via the data connection.

The interfaces may establish data connection by a wired electrical contact or may employ wireless technology.

Besides the data connection functionality of the docking station, the docking station may also be configured to provide mechanical functionality (e.g., said releasably mounting). The releasably mounting may refer to releasably holding the portable device in a fixed position with respect to the docking station. For example, in the fixed position the first and third interfaces may mate or engage with each other to establish electrical contact and, thereby, establish data connection.

At least a part of the fourth interface may be covered by the docking station when the portable device is mounted in the docking station.

When the portable device is mounted to the docking station, it may be desirable that at least a part of the fourth interface is covered and thereby shielded by the docking station against external influences such as dust, particles, etc. In other words, the docking station may also function as a mechanical cover or housing for such parts of the portable device which are not needed during in-vehicle operation.

The docking station may further comprise a converter being configured for receiving a data signal based on a first data connection standard via one of the second interface or third interface, converting the data signal to a second data connection standard, and transmitting the converted data signal via the other one of the third interface or second interface.

For example, the converter may comprise a processor which is configured to encode, and/or decode the data signal respectively. In various embodiments, the converter may convert the data signal received from the third interface via, for example, High-Definition Multimedia Interface (HDMI) data connection standard and/or the Universal Asynchronous Receiver Transmitter (UART) data connection standard to the MOST data connection standard transmitted via the second interface.

The data signal may be selected from the group consisting of: raw file data; multimedia stream; video and audio signal; control data signal; analogue audio signal; analogue video signal.

The raw file data may correspond to respectively encoded audio data and/or video data and/or image data. For example, the raw file data may be encoded according to standards such as MP3, AVI, JPEG, TIFF, MOV, etc. The multimedia stream may correspond to incremental fractions of the entire multimedia track being transmitted serially.

For example, the first interface of the portable device and/or the third interface of the docking station may be configured to operate according to at least one data connection standard selected from the group consisting of: Universal Serial Bus (USB), High Definition Multimedia Interface (HDMI), Wireless Local Area Network (WLAN), Bluetooth, Near Field Communication (NFC), UART, Ethernet, General Purpose Input/Output (GPIO), and SATA.

The docking station may further include locking means being configured to receive and fixedly mount and, in response to a user actuation, release the portable device.

For example, the locking means may comprise engagement means which engage with receiving means arranged on an outer surface of the portable device. The locking means may comprise resilient means which facilitate the engagement. The user actuation may relate to a turning or pushing action of a user. The particular user actuation necessary to release the portable device may depend on the specific design of the locking means.

For example, the locking means may prevent unintentional or accidental release of the portable device from the docking station. By such techniques, it may be possible to provide shock absorption and shielding against vibrations which may typically occur in the in-vehicle environment of the vehicle multimedia system.

The second and third interfaces of the docking station and the first interface of the portable device may be configured to enable data access to the data storage of the portable device as an integrated data storage of the vehicle head unit.

Integrated data storage may refer to a scenario where the vehicle head unit is configured to access the data storage of the portable device as internal memory (e.g., in comparison to an external memory). Therefore, despite the structural and mechanical separation of the portable device and the vehicle head unit, by means of the docking station it may be possible to electrically fully integrate the portable device.

Accessing the data storage of the portable device as an integrated data storage may have the effect of decreased latency and full control over the operation of the portable device (e.g., via the vehicle head unit). A user-friendly control of multimedia playback of the multimedia data stored on the data storage of the portable device may be achieved.

The portable device may further comprise a processor configured for selecting a first mode of operation when data connection is established between the portable device and the docking station and a second mode of operation when data connection is established between the portable device and a home entertainment system. Depending on the selected first or second mode of operation, the first interface and/or the second interface of the portable device may be configured to operate using a first or second predefined data communication standard for data communication.

The processor may be further configured for detecting an electrical connection via the first interface or the fourth interface, respectively. Based on said detecting, the processor may select the first mode of operation or the second mode of operation.

By providing dedicated first or second modes of operation depending on which interface is used for establishing data connection with the docking station or the home entertainment system, a high level of integration of the portable device into the vehicle multimedia system may be achieved while at the same time allowing flexible and universal connection to various third-party home entertainment systems. In particular, the first and second predefined standards may be different and respectively suited for the data connection with the docking station or the home entertainment system.

According to a further aspect, a vehicle comprising the vehicle multimedia system according to a further aspect is provided.

For such a vehicle effects may be obtained, which are comparable to the effects obtained for the vehicle multimedia system according to a further aspect of the present invention.

According to a further aspect, a vehicle multimedia system including a docking station is provided. The docking station is configured for releasably mounting a portable device. The docking station includes a second interface configured for establishing data connection with a vehicle head unit. The docking station further includes a third interface configured for establishing data connection with the portable device. The docking station is configured to transmit multimedia data between the vehicle head unit and a data storage of the portable device.

For such a vehicle multimedia system, effects may be obtained which are comparable to the effects obtained for the vehicle multimedia system according to a further aspect of the present invention.

It is to be understood that the features mentioned above and those yet to be explained below may be used not only in the respective combinations indicated, but also in other combinations or in isolation without departing from the scope of the invention. For example, features of the vehicle multimedia systems according to the various aspects of the present invention may be combined.

BRIEF DESCRIPTION OF THE DRAWINGS

In the following, the invention will be explained in further detail with respect to embodiments illustrated in the accompanying drawings.

DETAILED DESCRIPTION

Figure 1:
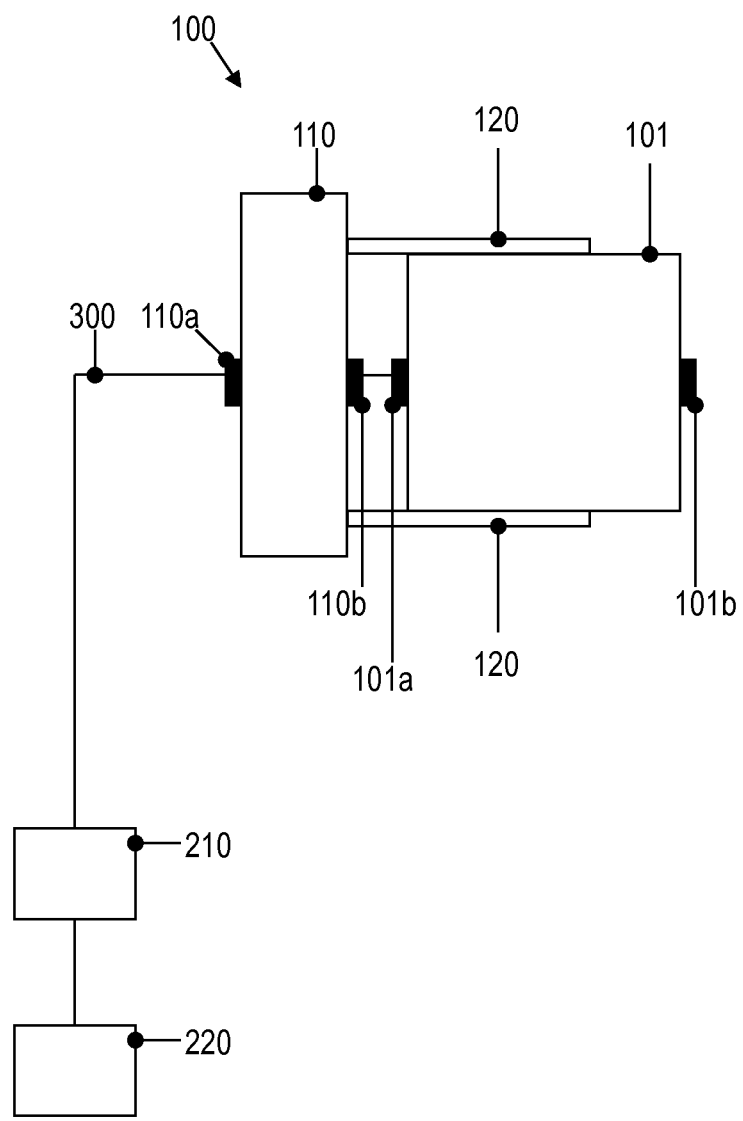
FIG. 1 is a schematic illustration of a vehicle multimedia system according to various embodiments, wherein the vehicle multimedia system comprises a portable device releasably mounted in a docking station.

In the following, techniques for a vehicle multimedia system are discussed with reference to the Figures; in the Figures, like numerals denote like elements. The drawings are to be regarded as being schematic representations, and elements illustrated in the drawings are not necessarily shown to scale. Rather, the various elements are represented such that their function and general purpose become apparent to a person skilled in the art. Any connection or coupling between functional blocks, devices, components or other physical or functional units shown in the drawings or described herein may also be implemented by an indirect connection or coupling. A coupling between components may also be established over a wireless connection. Functional blocks may be implemented in hardware, firmware, software or a combination thereof.

In FIG. 1, a vehicle multimedia system 100 is depicted. The vehicle multimedia system 100 comprises a portable device 101 and a docking station 110. In the state shown in FIG. 1, the portable device 101 is mounted to the docking station 110. The docking station 110 is configured to release the portable device 101 upon user actuation. To facilitate said releasably mounting of the portable device 101, the docking station 110 comprises locking means 120 which are configured to receive and fixedly mount and, in response to the user actuation, release the portable device 101. In the scenario of FIG. 1, the locking means 120 engage with opposing side walls of the portable device 101. For example, the locking means 120 may comprise resilient means, knobs or rotary knobs, which allow the user to actuate and thereby release the portable device 101. Such actuation means are not shown in FIG. 1.

As the vehicle multimedia system 100 is located in a vehicle, the mounting of the portable device 101 in the docking station 110 may have the effect of vibration damping. In particular, movable electronic parts of the portable device 101 (e.g., data storage) may therefore be guarded against unwanted shock and vibration.

Besides the mechanical features having, inter-alia, the purpose of said releasably mounting of the portable device 101, the docking station 110 further facilitates data connection between the portable device 101 and a vehicle head unit 210.

For this, the portable device 101 comprises a first interface 101a which is configured for establishing data connection with the docking station 110. The docking station 110 comprises an interrelated third interface 110b which is, respectively, configured for establishing data connection with the portable device 101. For example, when the portable device 101 is releasably mounted in a defined and fixed position within the docking station 110, the first interface 101a of the portable device 101 may be in electrical contact with the third interface 110b of the docking station 110. Thereby, data connection can be established.

For example, a supply power may as well be provided to the portable device 101 via the first and third interfaces 101a, 110b.

By mounting the portable device 101 in a defined position, the electrical contact between the first and third interfaces 101a, 110b can be provided. This may in particular apply to a scenario where the data connection is established via a wired electrical connection. However, in general it should be understood that it is also possible that the first and third interfaces 101a, 110b are implemented using a wireless connection (e.g. employing WLAN or Bluetooth). In such a scenario it may not be necessary that the first and second interfaces 101a, 110b are in a particular positional dependence (i.e., have a well-defined relative position) when the portable device 101 is mounted to the docking station 110.

Furthermore, the docking station 110 comprises a second interface 110a which is configured for establishing data connection with the vehicle head unit 210. For example, the data connection between the second interface 110a of the docking station 110 and the vehicle head unit 210 can be established via a vehicle data line 300 (e.g., employing a vehicle bus system as data connection standard such as the Media Orientated System Transport (MOST) bus system or the Controller Area Network (CAN) bus system).

The vehicle head unit 210 can then access the portable electronic device 101 via the interfaces 110a, 110b, 101a. In general, the data connection standard used for the connection of the vehicle head unit 210 with the second interface 110a on the one hand, and the data connection standard used for the connection of the third interface 110b with the first interface 101a on the other hand can be different but also may be the same.

With the interfaces 101a, 110b, 110a, a data connection between the portable device 101 and the vehicle head unit 210 can be established and supported. By such means, it is possible to bi-directionally transmit multimedia data or any other data between the vehicle head unit 210 and data storage provided in the portable device 101. For example, the multimedia data stored on the data storage of the portable device 101 can relate to audio files, video files, image data, etc. A user may select, for example, via a user interface 220 coupled to the vehicle head unit 210, multimedia data stored on the portable device 101 for playback. In other words, the access to and the playback of the multimedia data may be controlled by the vehicle head unit 210. In particular, it is possible that the second and third interfaces 110a, 110b of the docking station 110 and the first interface 101a of the portable device 101 are configured to enable access to the data storage of the portable device 101 by the vehicle head unit 210 as an integrated data storage of the vehicle head unit 210. In other words, when the portable device 101 is mounted to the docking station 110, data access of the vehicle head unit 210 to the portable device 101 may be comparable to a scenario where the data storage of the portable device 101 is internal memory of the vehicle head unit 210.

For example, the vehicle head unit 210 may be located close to the middle console of the vehicle, while the docking station 110 can be located remote from the vehicle head unit) e.g., integrated in the dashboard, etc.).

Furthermore as shown in FIG. 1, a fourth interface 101b of the portable device 101 which is configured to establish data connection between the portable device 101 and a home entertainment system (not shown in FIG. 1).

Figure 2:
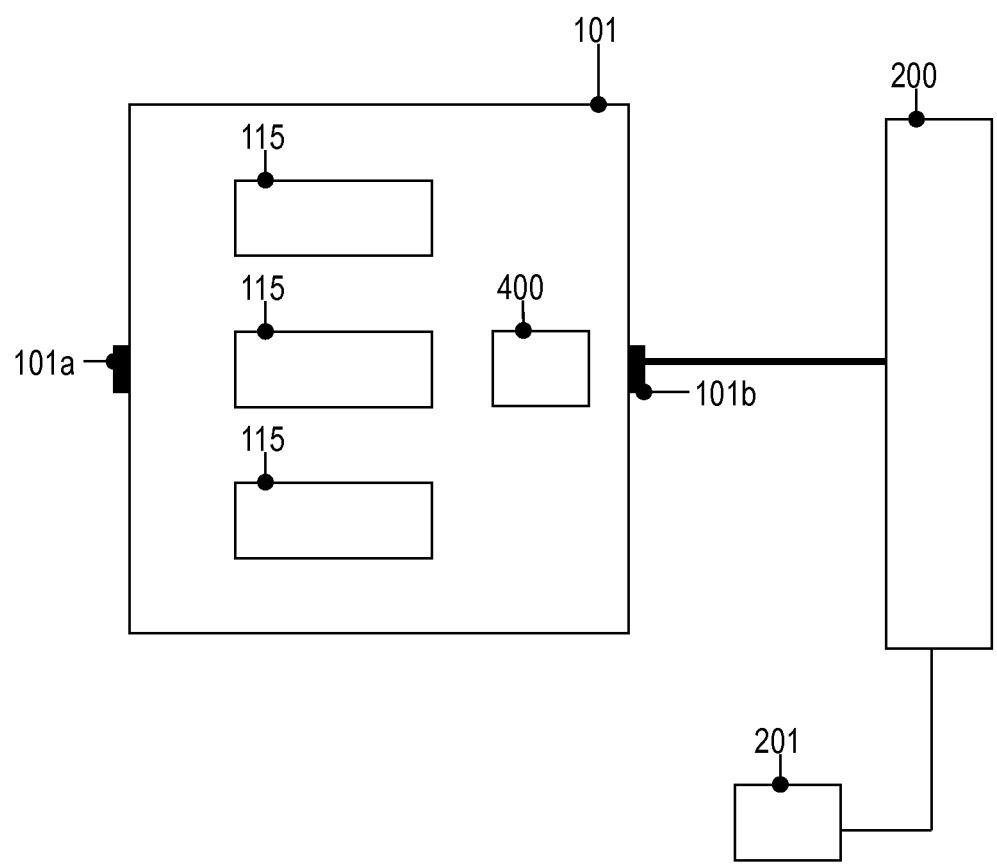
FIG. 2 is a schematic illustration of the portable device of FIG. 1 being connected to a home entertainment system.

The state of operation where the portable device 101 of the vehicle multimedia system 100 is connected via the fourth interface 101b to the home entertainment system 200 is shown in FIG. 2. It should be understood that the scenario of FIG. 2 (i.e., where the portable device 101 is connected to the home entertainment system 200) relates to a state where the portable device 101 is disconnected from the docking station 110 of the vehicle multimedia system 100. For example, the home entertainment system 200 can comprise loudspeakers 201 and thereby allow playback of the multimedia data stored on the data storage 115 of the portable device 101.

As shown in FIG. 2, it is possible that the portable device 101 comprises one or more data storages 115. For example, the data storage 115 of the portable device 101 can comprise storage means selected from the group consisting of: BluRay Disc, Compact Disc, Hard Disc Drive, and Flash memory.

In FIGS. 1 and 2, the first and fourth interfaces 101a, 101b of the portable device 101 are shown as being located on opposing surfaces or side walls of the portable device 101. It should be understood that these illustrations are merely schematic and, in general, the first and fourth interfaces 101a, 101b can be located in any arbitrary position with respect to each other (e.g., in close proximity on the same side surface of the portable device 101). It is even possible that the first and fourth interfaces 101a, 101b share some common parts (e.g., electrical contacts such as pins, etc.).

It is possible that at least a part of the fourth interface 101b is covered by the docking station 110 when the portable device 101 is in a state where it is mounted in the docking station 110. By such techniques, it is possible to shield off dust, particles, etc. from the exposed parts of the fourth interface 101b. Likewise, it is possible that at least parts of the first interface 101a of the portable device 101 are covered when the portable device 101 is connected to the home entertainment system 200.

Figure 3:
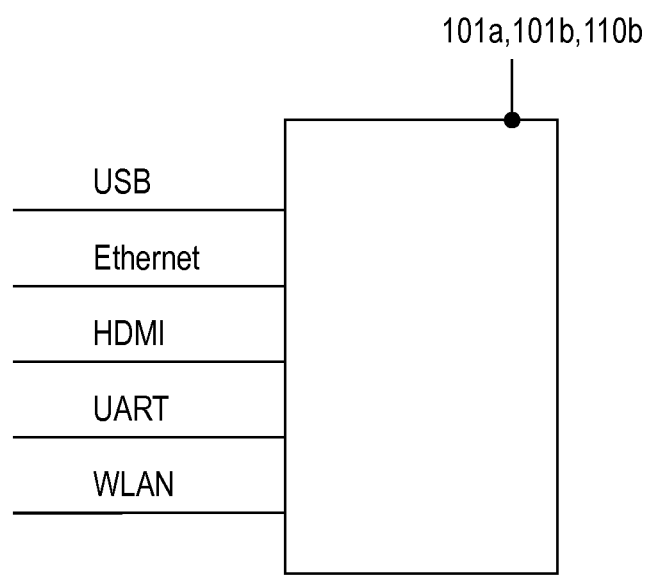
FIG. 3 schematically illustrates interfaces of the portable device and the docking station of FIG. 1.

In FIG. 3, the first and second interfaces 101a, 101b of the portable device 101 and the third interface 110b of the docking station 110 are illustrated in greater detail. While in FIG. 3 different techniques are discussed with respect to all of these interfaces 101a, 101b, 110b, it should be understood that the individual interfaces can be configured differently (e.g., operate according to a specific data connection standard, have different mechanical layout, etc.).

In FIG. 3 it is illustrated that the interfaces 101a, 101b, 110b can operate to one or more different data connection standards such as USB, HDMI, WLAN, Bluetooth, NFC, UART, Ethernet, GPIO, etc.

For this purpose, the docking station 110 can comprise a processor or converter. The converter is configured to (i) receive a data signal based on a first data connection standard from one of the second or third interfaces 110a, 110b, (ii) convert the data signal to a second data connection standard and (iii) transmit the converted data signal via the other one of the second or third interfaces 110a, 110b.

For example, this may have the effect that data connection between the second interface 110a of the docking station 110 and the vehicle head unit 210 is established based on a data connection standard compatible with the MOST or CAN bus system, while the data connection established between the third interface 110b of the docking station 110 and the first interface 101a of the portable device 101 can be established based on another suited data connection standard such as those noted above. This may allow for a high degree of integration of the portable device 101 with the vehicle multimedia system 100 (i.e., allow for a direct access of the vehicle head unit 210 to the data storage 115 of the portable device 101). For example, the vehicle head unit 210 may manage and control the multimedia data of the data storage 115.

Turning again to FIG. 2, a processor 400 of the portable device 101 is shown. The processor 400 can be configured for selecting a first mode of operation when data connection is established between the portable device 101 and the docking station 110 (i.e., via the first interface 101a, and a second mode of operation when data connection is established between the portable device 101 and the home entertainment system 200, or through the fourth interface 101b). Depending on a selected first or second mode of operation, the first interface 101a and/or the fourth interface 101b of the portable device 101 are configured to operate using a first or second predefined standard for data communication.

In other words, when it is detected that the portable device 101 is mounted in the docking station 110 and data connection between the first interface 101a and the third interface 110b is established, a particular predefined data communication standard can be selected for the data communication. In particular, a different data communication standard may be selected for data communication via the fourth interface 101b when it is detected that the portable device 101 is connected to the home entertainment system 200. For example, the second mode of operation may relate to selecting the USB and/or HDMI standard for data communication. Respectively, the first mode of operation may relate to selecting the Ethernet, WLAN, UART, SATA, HDMI, and/or GPIO standard for data communication. Selecting the particular standards for data communication in the first mode of operation may facilitate integrating the data storage 115 of the portable device 101 as integrated data storage of the vehicle head unit 210.

Likewise, the data signal transceived by the converter can vary and, for example, be selected form the group consisting of: raw file data; a multimedia stream; a vehicle and audio signal; control data signal; and audio signal.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

What is claimed is:

1. A vehicle multimedia system, comprising:
a docking station configured to releasably mount a portable device that includes a data storage to store multimedia data and a first interface configured to establish a data connection with the docking station, the docking station includes a second interface configured to establish a data connection with a vehicle head unit, and a third interface configured to establish the data connection with the portable device,
wherein the docking station further includes:
a converter being configured to: (i) receive a multimedia playback data signal based on a first data connection standard via the second interface, (ii) convert the multimedia playback data signal to a second data connection standard, and (iii) transmit the converted multimedia playback data signal via the third interface to the portable device;
wherein the multimedia playback data signal includes the multimedia data for storage on the data storage of the portable device;
wherein the docking station is configured to enable data access to the data storage of the portable device as an integrated data storage of the vehicle head unit, and
wherein the converter is further configured to convert the multimedia playback data signal from the second data connection standard that is a Media Orientated System Transport (MOST) standard for playback of the multimedia playback data signal in a vehicle into the first data connection standard that is at least one of a High-Definition Multimedia Interface (HDMI) standard, a Universal Asynchronous Receiver Transmitter (UART) standard, a Universal Serial Bus (USB) standard, a Wireless Local Area Network (WLAN) standard, and a Bluetooth standard for storage on the portable device.

2. The vehicle multimedia system of claim 1, wherein the portable device further comprises:
a fourth interface being configured to establish the data connection with a home entertainment system.

3. The vehicle multimedia system of claim 2, wherein at least a part of the fourth interface is covered by the docking station when the portable device is mounted in the docking station.

4. The vehicle multimedia system of claim 1, wherein the multimedia playback data signal is selected from the group consisting of:
raw file data;
multimedia stream;
video and audio signal;
control data signal;
analogue audio signal; and
analogue video signal.

5. The vehicle multimedia system of claim 1, wherein the converter is configured to receive a data signal based on the first data connection standard via the third interface; and
wherein the converter is further configured to transmit a converted data signal based on the second data connection standard via the second interface.

6. The vehicle multimedia system of claim 1, wherein at least one of the first interface of the portable device and the third interface of the docking station are configured to operate according to at least one data connection standard selected from the group consisting of: USB standard, the HDMI standard, the WLAN standard, the Bluetooth standard, Near Field Communication (NFC), Ethernet, General Purpose Input/Output (GPIO), and Serial Advanced Technology Attachment (SATA).

7. The vehicle multimedia system of claim 1, wherein the data storage of the portable device comprises storage device selected from the group consisting of: BluRay Disc, Compact Disc, Hard Disc Drive, and flash memory.

8. The vehicle multimedia system of claim 1, wherein the docking station further comprises:
locking means being configured to receive and fixedly mount and, in response to a user actuation, release the portable device.

9. The vehicle multimedia system of claim 1, wherein the portable device further comprises:
a processor configured for selecting a first mode of operation when data connection is established between the portable device and the docking station via the first interface and a second mode of operation when data connection is established between the portable device and a home entertainment system via a fourth interface, and
wherein, depending on the selected first or second mode of operation, at least one of the first interface and the fourth interface of the portable device is configured to operate using a first predefined data communication standard or a second predefined data communication standard for data communication.

10. The vehicle multimedia system of claim 9, wherein in the first mode of operation the first interface is configured to operate according to the HDMI standard, and
wherein in the second mode of operation the fourth interface is configured to operate according to the USB standard.

11. The vehicle multimedia system of claim 1, wherein the first interface and the third interface operate according to the HDMI standard, and
wherein the second interface operates according to the MOST standard.

12. The vehicle multimedia system of claim 2, wherein the fourth interface operates according to at least one of the USB standard and the HDMI standard.

13. A vehicle multimedia system, comprising:
a docking station configured to receive a portable device that includes a data storage for storing multimedia data and a first interface that is configured to establish a data connection with the docking station,
wherein the docking station includes:
a second interface being configured to establish a data connection with a vehicle head unit;
a third interface being configured to establish data connection with the portable device, and
a converter being configured to: (i) receive a multimedia playback data signal based on a first data connection standard via the second interface, (ii) convert the multimedia playback data signal to a second data connection standard, and (iii) transmit the converted multimedia playback data signal via the third interface to the portable device, wherein the multimedia playback data signal includes the multimedia data for storage on the data storage of the portable device, wherein the docking station is configured to enable data access to the data storage of the portable device as an integrated data storage of a vehicle head unit, and wherein the converter is further configured to convert the multimedia playback data signal from the second data connection standard that is a Media Orientated System Transport (MOST) standard for playback of the multimedia playback data signal in a vehicle into at least one of a High-Definition Multimedia Interface (HDMI) standard, a Universal Asynchronous Receiver Transmitter (UART) standard, a Universal Serial Bus (USB) standard, a Wireless Local Area Network (WLAN) standard, and a Bluetooth standard for storage on the portable device.

14. The vehicle multimedia system of claim 13, wherein the portable device further comprises:
a fourth interface being configured for establishing a data connection with a home entertainment system.

15. The vehicle multimedia system of claim 14, wherein at least a part of the fourth interface is covered by the docking station when the portable device is mounted in the docking station.

16. The vehicle multimedia system of claim 13, wherein the second interface and the third interface of the docking station and the first interface of the portable device are configured to enable data access to the data storage of the portable device as an integrated data storage of the vehicle head unit.

17. A vehicle multimedia system, comprising:
a docking station including a first interface for establishing a data connection with a vehicle head unit and a second interface for establishing a data connection with a portable device that includes data storage for storing multimedia data and a portable device interface for establishing a data connection with the docking station, wherein the docking station is configured to releasably receive the portable device, wherein the docking station further includes:
a converter being configured for (i) receiving a multimedia playback data signal based on a first data connection standard via the first interface, (ii) converting the multimedia playback data signal to a second data connection standard, and (iii) transmitting the converted multimedia playback data signal via the second interface to the portable device, wherein the multimedia playback data signal includes the multimedia data for storage on the data storage of the portable device, wherein the docking station is further configured to enable data access to the data storage of the portable device as an integrated data storage of the vehicle head unit, and wherein the converter is further configured to convert the multimedia playback data signal from the second data connection standard that is a Media Orientated System Transport (MOST) standard for playback of the multimedia playback data signal in a vehicle into at least one of a High-Definition Multimedia Interface (HDMI) standard, a Universal Asynchronous Receiver Transmitter (UART) standard, a Universal Serial Bus (USB) standard, a Wireless Local Area Network (WLAN) standard, and a Bluetooth standard for storage on the portable device.

* * * * *